United States Patent
Chi

(10) Patent No.: US 8,898,496 B1
(45) Date of Patent: Nov. 25, 2014

(54) CONTEXT-BASED POWER MANAGEMENT

(75) Inventor: Liang-Yu (Tom) Chi, San Francisco, CA (US)

(73) Assignee: Google Inc., Mountain View, CA (US)

(*) Notice: Subject to any disclaimer, the term of this patent is extended or adjusted under 35 U.S.C. 154(b) by 313 days.

(21) Appl. No.: 13/427,893

(22) Filed: Mar. 23, 2012

(51) Int. Cl.
| | |
|---|---|
| G06F 1/00 | (2006.01) |
| G06F 1/32 | (2006.01) |
| G01R 15/00 | (2006.01) |
| G06F 15/00 | (2006.01) |
| G01C 9/00 | (2006.01) |
| H04M 1/00 | (2006.01) |

(52) U.S. Cl.
CPC ............ *G06F 1/3206* (2013.01); *G06F 1/3231* (2013.01)
USPC ............. 713/323; 713/320; 702/57; 702/141; 702/150; 455/574

(58) Field of Classification Search
CPC .............................. G06F 1/3206; G06F 1/3231
USPC ............. 713/320, 323; 455/574; 702/57, 141, 702/150
See application file for complete search history.

(56) References Cited

U.S. PATENT DOCUMENTS

| | | | |
|---|---|---|---|
| 7,176,833 B2 * | 2/2007 | Jendbro et al. ........... | 342/357.64 |
| 7,477,207 B2 | 1/2009 | Estep | |
| 7,898,107 B2 | 3/2011 | Brieskorn | |
| 2004/0239874 A1 | 12/2004 | Swab et al. | |
| 2005/0264527 A1 | 12/2005 | Lin | |
| 2009/0195497 A1 | 8/2009 | Fitzgerald et al. | |
| 2009/0244048 A1 | 10/2009 | Yamanaka | |
| 2009/0267954 A1 | 10/2009 | Cupps et al. | |
| 2009/0307511 A1 | 12/2009 | Fiennes et al. | |
| 2010/0040120 A1 | 2/2010 | Sharma | |
| 2010/0149073 A1 | 6/2010 | Chaum et al. | |
| 2010/0235667 A1 | 9/2010 | Mucignat et al. | |
| 2010/0240988 A1 | 9/2010 | Varga et al. | |
| 2010/0328284 A1 * | 12/2010 | Noguchi ........................ | 345/207 |
| 2012/0235896 A1 * | 9/2012 | Jacobsen et al. .............. | 345/156 |

FOREIGN PATENT DOCUMENTS

EP   1313005   5/2003

OTHER PUBLICATIONS

Marc A. Viredaz, Lawrence S. Brakmo, William R. Hamburgen, Energy Management on Handheld Devices, Queue—Power Management, vol. 1 Issue 7, Oct. 1, 2003, ACM: New York, NY.

* cited by examiner

*Primary Examiner* — Stefan Stoynov
(74) *Attorney, Agent, or Firm* — McDonnell Boehnen Hulbert & Berghoff LLP

(57) ABSTRACT

In an embodiment, a computing system causes a computing device to operate in a lower-power state. Data received from a first tier of low-power input source(s) is used to determine user/environmental context and activate a second tier of input source(s) that operate in a higher power range. In each tier the system is running contextual detection to assess whether to engage higher power input sources or sensors to aid the user. With this mechanism, a user is able to have access to a broad range of services without having to explicit switch them on, while the system is able to intelligently manage power and battery life across input sources.

24 Claims, 10 Drawing Sheets

CONTEXT-BASED POWER MANAGEMENT

BACKGROUND

Unless otherwise indicated herein, the materials described in this section are not prior art to the claims in this application and are not admitted to be prior art by inclusion in this section.

Location-aware and/or context-aware "wearable" devices may be configured to provide an augmented-reality experience for users as they go about various aspects of everyday life. These devices may be configured to sense and analyze a user's environment, and to intelligently provide information appropriate to the physical world as the user experiences it. Such wearable devices may sense a user's surroundings by determining a user's geographic location, detecting objects within the user's field of vision, and detecting what a user is hearing, and/or by carrying out one or more other examples. Further, wearable devices may be able to detect one or more aspects of the user's own physical state. The information collected by the wearable devices may then be analyzed in order to determine what—if any—information to present to the user.

Many wearable devices include or take the form of a head-mounted display (HMD) that is worn by the user. An HMD typically provides a heads-up display near the user's eyes. As such, HMDs may also be referred to as "near-eye" displays. HMDs typically overlay computer-generated graphics (e.g., text, images, and/or video, etc.) onto the user's perception of the physical world. HMDs may include some form of display that renders graphics in front of one or both of the user's eyes in a manner that causes the user to perceive the computer-generated graphics and the physical world simultaneously. HMDs that include displays in front of both of the user's eyes are often referred to as "binocular" HMDs, while those that include a display in front of just one eye are often referred to as "monocular" HMDs.

HMDs may integrate computer-generated graphics in the user's view of the physical world using a number of techniques. For example, "see-through" HMDs typically display graphics on a transparent surface so that the user sees the physical world while essentially looking through the overlaid graphics. As another example, "see-around" HMDs typically overlay a display on the physical world by placing the display close to the user's eye in order to take advantage of the "sharing" of vision between a user's eyes, and create the effect of the display accompanying the view of the world seen as by the user.

An HMD may include a "point-of-view" video camera aligned with the user's frame of reference and mounted on the wearable device, so as to track movement of the user's head. Because it effectively captures what the user is seeing at a given point in time, this video can be analyzed to detect objects and/or people within the user's view, to identify these objects and/or people, and to display information via the wearable device that corresponds to these objects and/or people. Furthermore, analysis of the video may be used to determine where a given object or person is located in the user's frame of reference, and to display corresponding information in the wearable device such that the user sees the corresponding information as "floating" over or near the given object or person.

As an example, when a user is looking at a friend, a video camera on the user's HMD may capture video of the friend. The video can then be analyzed using, for example, facial-recognition techniques. As such, the HMD may identify the friend, and may accordingly display information related to the friend such that the user sees the information appear to the user to be proximate their friend. For example, the HMD may display the friend's name, contact information, birthday, etc.

SUMMARY

In one aspect, an embodiment takes the form of a computing system comprising a non-transitory computer-readable medium and program instructions stored on the non-transitory computer-readable medium and executable by at least one processor to cause a computing device to operate in a lower-power state. Data is received from a first input source while in the lower-power state, and power consumption of a second input source is lower in the lower-power state. The program instructions are further executable to cause the computing device to operate in a higher-power state. The power consumption of the second input source is greater in the higher-power state than in the lower-power state, and the power consumption of the second input source in the higher-power state is greater than power consumption of the first input source in the higher-power state. The program instructions are further executable to, while the computing device is in the lower-power state, determine that at least a threshold likelihood exists that detection of a context of the computing device will improve by causing the second input source to operate in the higher-power state, and responsively cause the computing device to operate in the higher-power state.

A further embodiment takes the form of an apparatus including a processor, a display element configured to receive information from the processor and to display the information, a wearable frame structure supporting the display element, a plurality of input sources (which includes a first input source, a second input source, and a third input source), a power source (which includes a battery power source) configured to provide power to at least the processor, the display element, and the plurality of input sources, and a power controller. An average power consumption of the first input source places the first input source in a first power-consumption tier, and an average power consumption of the second input source places the second input source in a second power-consumption tier. The second power-consumption tier is associated with greater power consumption than is the first power-consumption tier. The power controller is configured to managed power consumption of the plurality of input sources at least in part by (i) causing the first input source to remain in an always-on state, and (ii) causing the second input source to transition from a second-input-source low-power state up to a second-input-source higher-power state responsive to detecting a first context trigger via the first input source.

These as well as other aspects and advantages will become apparent to those of ordinary skill in the art by reading the following detailed description with reference where appropriate to the accompanying drawings.

DETAILED DESCRIPTION OF THE DRAWINGS

Figure 1:
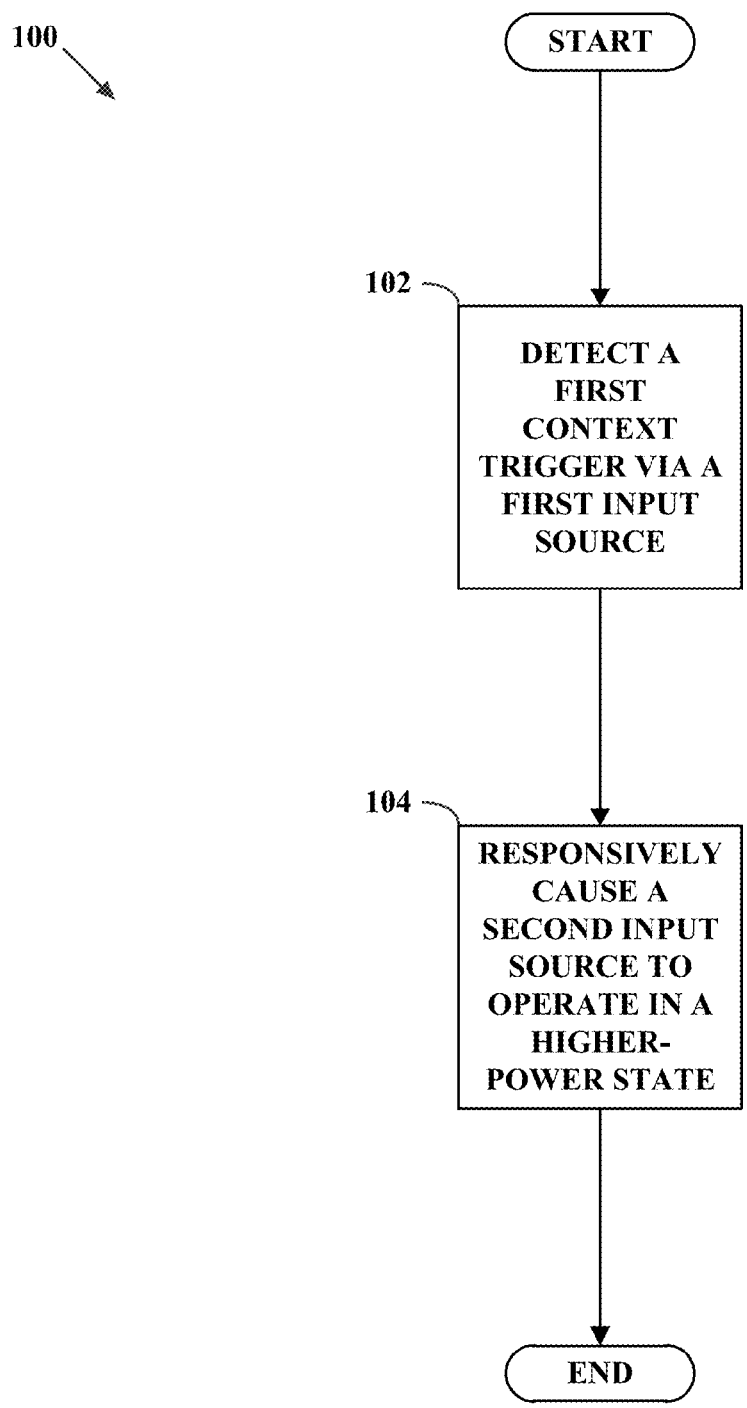
FIG. 1 is a flowchart of a method, in accordance with exemplary embodiments.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

A wearable device may include one or more input sources (such as input devices, sensors, etc.) that help facilitate interpretation of the device's environment or "context". Examples of such input sources include a microphone (for recording sound and/or speech), a global positioning system (GPS) device (for location tracking), and a video or still camera, among numerous other possibilities.

However, as with most mobile devices, wearable devices typically provide only limited power supplies, and as newer generations of wearable devices are designed with more advanced context-detection functionality, the number of input sources included with these wearable devices, as well as the power requirements for these input sources, place increasing strains on wearable-device power supplies.

An exemplary wearable device overcomes these limitations by generally maintaining all high-power-consumption input sources in a lower-power (e.g., off or sleep) state at any given time, and transitioning the input sources to a higher-power state only upon detecting a "context trigger" from a low-power-consumption input source (e.g., a photodiode or an accelerometer). By using context triggers detected via low-power-consumption input sources, the wearable device can determine whether additional (i.e., high-power-consumption) input sources would be able to assist in context detection and interaction, but without having to constantly maintain those additional input sources in the higher-power state.

In an exemplary wearable device, the input sources are classified into tiers based on the power consumption of the respective input sources. For example, the first tier contains input sources that consume the least amount of power (and generally provide the least context-interaction functionality), while the second tier contains input sources that consume more power than those in the first tier (but generally provide more context-interaction functionality). A third tier would contain input sources that consume more power than those in either the first or second tiers, and so on. The wearable transitions the input sources from a lower-power state to a higher-power state only upon detecting a context trigger from an input source in a tier lower than the given tier. For example, if the wearable device classified input sources into two tiers, then the wearable device would transition the input sources in the second tier to the higher-power state only upon detecting a context trigger from an input source in the first tier. As another example, if the wearable device classified input sources into three tiers, then the wearable device would transition the input sources in the second tier to the higher-power state only upon detecting a context trigger from an input source in the first tier, and would further transition the input sources in the third tier to the higher-power state only upon detecting a context trigger from an input source in either the first tier or the second tier. It should be understood that the input sources may be classified into any number of tiers without departing from the scope of the claims.

In another exemplary wearable device, the input sources are classified into three tiers based on the power consumption of the respective input sources. The first tier includes low-power sensors such as an accelerometer, a microphone, and ambient light sensor. The second tier includes input sources for facilitating speech to text processing, such as a microphone or other audio recording device, as well as input source for facilitating retrieval of location or other data, such as a GPS device and a wireless-communication device. The third tier includes high-power input sources for facilitating full-video-stream image processing and augmented reality, including a video and/or still camera. Those having skill in the art will understand that these classifications are provided merely as examples and that input sources may consume varying amounts of power and thus may be classified into different power-consumption tiers.

II. CONTEXT

In general, a "context" may be determined based on various "context signals" or combinations of context signals. A context signal may be any signal that provides a measurement or otherwise provides information pertaining to the state or the environment associated with a certain subject (e.g., with a certain user, device, event, etc.).

In some instances, a context may be a state associated with a particular context signals or set of context signals. However, a context may also be abstracted from the context signals upon which it is based. As such, a "context" may also be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

Many types of information, from many different sources, may be used as context signals or provide information from which context signals may be derived. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location, among others. Those skilled in the art will understand that the above list of possible context signals and sources of context information is not intended to be limiting, and that other context signals and/or sources of context information are possible in addition, or in the alternative, to those listed above.

In some embodiments, the detection or observation of a certain event in data from a certain data source may itself be interpreted as a context signal. For example, the fact that a certain word is detected in an audio signal from a microphone may be interpreted as a context signal providing context to the event of that word being spoken. Other examples are also possible.

In some embodiments, context signals may be obtained or derived from sources such as a user's computer-based calendar, blog, webpage, social network account, and/or e-mail account, among others. For instance, context signals may be provided by user's calendar entries, e-mail messages, and social-network profile, messages, posts, and/or tweets. Further, in some embodiments, similar context signals may be obtained or derived from other users' computer-based calendars, blogs, webpages, social network accounts, and/or e-mail accounts, who are listed in a user's electronic contact list, listed as a "friend" in a user's social network, or otherwise associated with the user (provided such users have opted in to share such context information).

It should be understood that the above examples of contexts, context signals, techniques for determining a context, and/or techniques for using context when selecting an advertisement are provided for illustrative purposes, and are not intended to be limiting. Other examples and/or techniques are also possible.

III. EXEMPLARY METHODS

FIG. 1 is a flowchart of a method, in accordance with exemplary embodiments. As shown in FIG. 1, method 100 begins at step 102 with a computing system detecting a first context trigger via a first input source. The method continues at step 104 with the computing system responsively causing a second input source to operate in a higher-power state.

The context trigger could be, for example, a change in a condition (such as lighting conditions, audible volume, movement, etc.) that can be detected via the first input source. The context trigger could also be one or more context signals (including a selected group of context signals). As another possibility, the context trigger could be a context. Other examples are possible as well.

In an embodiment, the second input source is configured to operate in a lower-power state or the higher-power state, and the power consumption of the second input source while operating in the higher-power state is greater than the power consumption of the first input source. Accordingly, while the first and second input sources are described below as taking various forms, those having skill in the art will recognize that these input sources may take any form so long as the power consumption of the second input source while operating in the higher-power state is greater than the power consumption of the first input source.

In an embodiment, the first input source is a photodiode, and the first context trigger is a detected change in lighting conditions surrounding the computing system. In this embodiment, the second input source may operate at the lower-power state during the nighttime while the computing-system user is sleeping. It may be desirable to provide a way for computing system to detect when the user wakes and responsively transition the second input source to the higher-power state. Accordingly, the photodiode could detect when the user wakes by detecting an increase in light when the user turns on the bedroom lights or when sunlight fills the bedroom, among other possibilities.

In another embodiment, the first input source is a photodiode, the first context trigger is a detected change in lighting conditions, and the second input sources include an audio recording device and a wireless-communication device. For example, it may be desirable for the computing system to detect when the user begins watching a movie or television show so that (i) the audio recording device can be transitioned to a higher-power state and can be used to determine the program being watched, and (ii) the wireless-communication device can be transitioned to a higher-power state and can download information regarding the program for the computing system to display to the user. In this embodiment, the photodiode could detect when the user begins watching the program by detecting an increase in light caused by the program source (for example, a television or computer screen), and/or a decrease in light caused by the user turning off lights to create a movie-theater-like setting.

In another embodiment, the first input source is a movement sensor, the first context trigger is a detected movement of the computing system, and the second input source is a GPS device. In this embodiment, the movement sensor could detect when the computing-system user wakes up from sleeping by detecting movement of the computing system (perhaps after a significant period of no movement if the computing system was not being worn by the user). As another example, it may be desirable for the computing system to detect when a user goes running, jogging, or walking so that, for example, the GPS device may be transitioned to a higher-power state and may be used to determine the distance and speed that the user is moving. The movement sensor could use the same methods as a pedometer to detect that the user is running or walking.

In an embodiment, the first input source is an audio recording device, the second input source is an imaging device, and the first context trigger is a determination that the user of the computing system (or a person in proximity to the computing system) is speaking. For example, it may be desirable for the computing system to detect when the computing-system user is talking to another individual so that, for example, the imaging device may be transitioned to a higher-power state and may be used for facial recognition of the other individual. In this embodiment, the audio recording device could detect when the computing-system user is talking to the other individual by detecting that the computing-system user is speaking.

As another example, it may be desirable for the computing system to detect when the computing-system user is speaking to the computing system. The computing-system user may be speaking while looking at an object (for example, a business card), and the user's speech may be associated with commands that the user wants the computing system to perform using an imaging device (such as visually scanning and storing the information on the business card). Accordingly, the computing system could detect (using the audio recording device) when the user is attempting to use the computing system to interact with another object by detecting that the user is speaking. In response, the computing system could transition the imaging device from a lower-power state to a higher-power state.

In another embodiment, the first input source is a GPS device, the second input source is an imaging device, and the first context trigger is the reception of location data received via the GPS device. For example, it may be desirable for the computing system to detect when a computing-system user has changed locations so that, for example, the imaging device may be transitioned to a higher-power state and may be used to take a still image at the user's location. Accordingly, the computing system could determine when to take a still image by via the GPS device 224 when the user's location has changed.

In still another embodiment, the first input source is a wireless-communication device, the second input source is an imaging device, and the second context trigger is the reception of calendar data, appointment data, and/or location data via the wireless-communication device. For example, it may be desirable for the computing system to detect if a user is currently at a location of significance (such as a landmark) so that, for example, the imaging device may be transitioned to a higher-power state and may be used to take a still image at the computing-system user's location. Accordingly, the computing system could determine whether the user is at a significant location by using the wireless-communication device (perhaps along with a GPS device) to receive data regarding the current location.

In an embodiment, the first input source is configured to operate in a first-input-source lower-power state or a first-input-source higher-power state. In this embodiment, the power consumption of the second input source while operating in the higher-power state could be greater than a power consumption of the first input source while operating in the first-input-source higher-power state and/or the first-input-source lower-power state. In another embodiment, the first input source is configured to operate in an always-on state. In this embodiment, the power consumption of the second input source while operating in the higher-power state could be greater than a power consumption of the first input source while operating in the always-on state.

It should be understood that the computing system may cause one second input source, or a plurality of second input sources, to operate in a higher-power state in response to detecting a first context trigger via a first input source.

Figure 2:
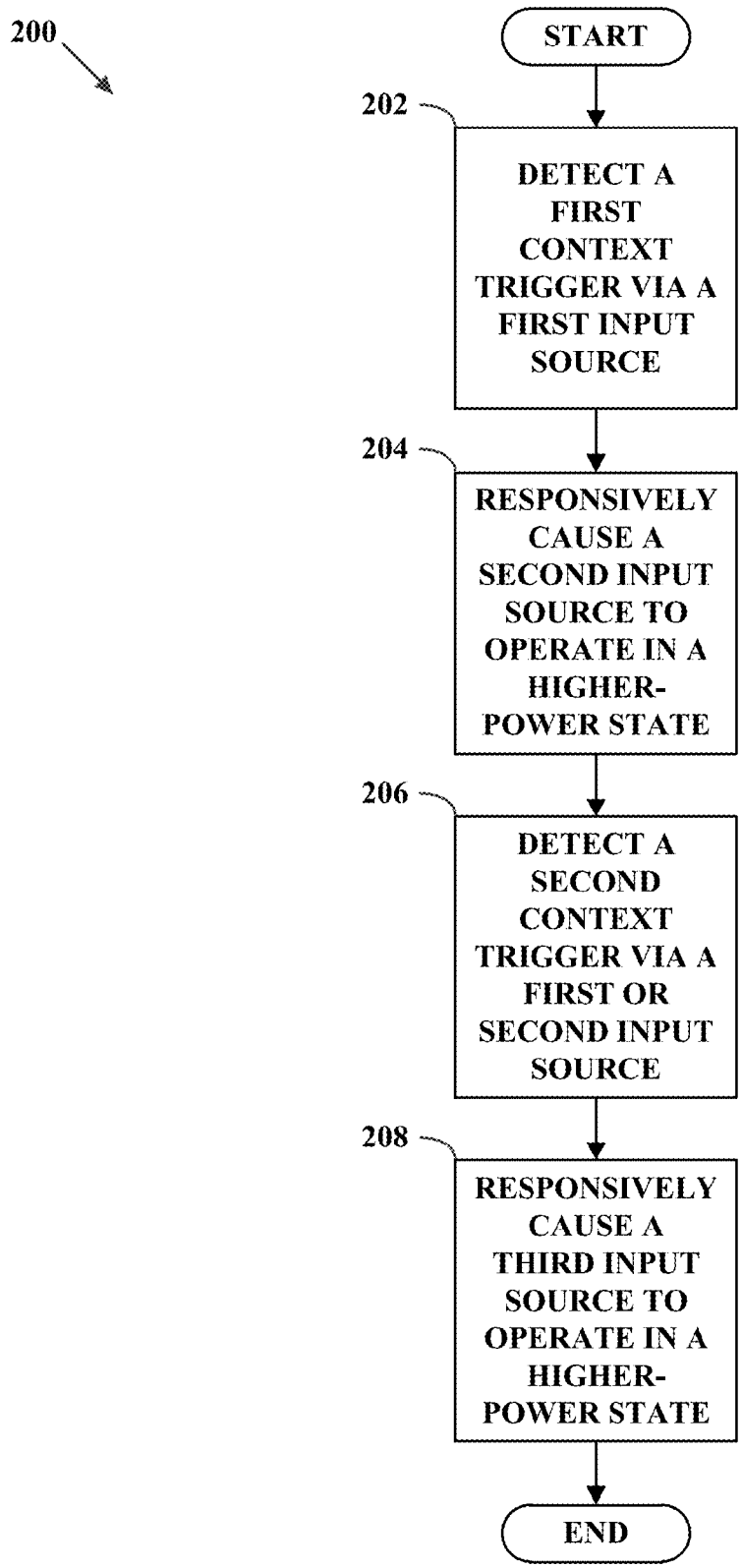
FIG. 2 is a flowchart of a second method, in accordance with exemplary embodiments.

FIG. 2 is a flowchart of a second method, in accordance with exemplary embodiments. As shown in FIG. 2, method 200 begins at step 202 with a computing system detecting a first context trigger via a first input source. The method continues at step 204 with the computing system responsively causing a second input source to operate in a higher-power state. At step 206, the computing system detects a second context trigger via the first input source or the second input source. The method continues at step 208 with the computing system responsively causing a third input source to operate in a third-input-source higher-power state.

In an embodiment, the second input source is configured to operate in a lower-power state or the higher-power state, and the power consumption of the second input source while operating in the higher-power state is greater than the power consumption of the first input source. Similarly, the third input source is configured to operate in a third-input-source lower-power state or the third-input-source higher-power state, and the power consumption of the third input source while operating in the third-input-source higher-power state is greater than the power consumption of the first input source and the second input source while operating in the higher-power state.

Accordingly, the first, second, and third input sources may take any form so long as (i) the power consumption of the second input source while operating in the higher-power state is greater than the power consumption of the first input source, and (ii) the power consumption of the third input source while operating in the third-input-source higher-power state is greater than the power consumption of (a) the first input source and (b) the second input source while operating in the higher-power state.

IV. EXEMPLARY TIER STRUCTURE AND METHOD

Figure 3:
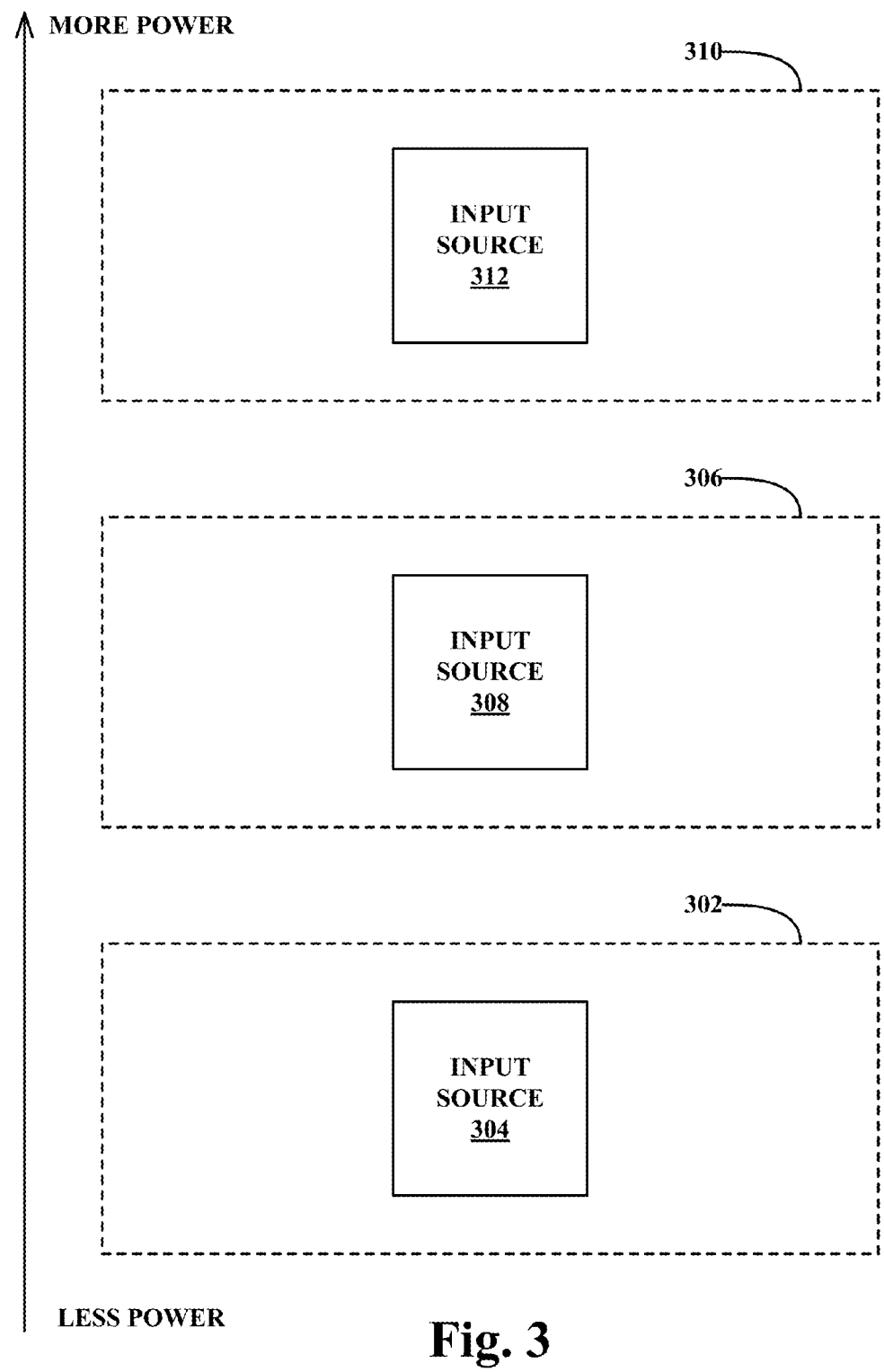
FIGS. 3 and 5-7 are simplified depictions of several power-consumption tiers of a computing system, in accordance with exemplary embodiments.

FIG. 3 is a simplified depiction of several power-consumption tiers of a computing system, in accordance with exemplary embodiments. As shown in FIG. 3, first power-consumption tier 302 may include first input source 304, second power-consumption tier 306 may include second input source 308, and third power-consumption tier 310 may include third input source 312.

In an embodiment, the input sources of a computing system are categorized into power-consumption tiers based on the power consumption of the devices, with input sources consuming the least amount of power generally being categorized into first power-consumption tier 302, and input sources with higher power consumptions being categorized into higher power-consumption tiers. For example, as shown in FIG. 3, third input source 312 in third power-consumption tier 310 consumes more power than second input source 308 in second power-consumption tier 306, which in turn consumes more power than first input source 304 in first power-consumption tier 302.

The power consumption of an input source could be measured using the average power consumption. Further, this average could be measured in a number of ways, since each input source may operate in a number of different power states, and since each input source may consume a variable amount of power even within a single power state. Additionally or alternatively, the power consumption could be measured using the maximum power consumption, or the minimum power consumption, among other examples.

Accordingly, in an embodiment, first input source 304 belongs to first power-consumption tier 302 based on an average power consumption of the first input source, second input source 308 belongs to second power-consumption tier 306 greater than the first power-consumption tier based on an average power consumption of the second input source, and third input source 312 belongs to third power-consumption tier 310 greater than the second power-consumption tier based on an average power consumption of the third input source.

Each power-consumption tier could be assigned a range, and input sources having an average power consumption within a respective range would belong to the corresponding tier. In an embodiment, first power-consumption tier 302 includes input sources having an average power consumption within a first range, second power-consumption tier 306 includes input sources having an average power consumption within a second range that is an order of magnitude greater than the first range, and third power-consumption tier 310 comprises input sources having an average power consumption within a third range that is an order of magnitude greater than the second range. For example, the first range could be less than 10 mW, the second range could be between 10 mW and 200 mW (inclusive or exclusive), and the third range could be more than 200 mW. Those having skill in the art will recognize that other ranges are possible as well without departing from the scope of the claims.

It should be understood that a power-consumption tier may contain more than one input source. It should also be understood that any specific level of power consumption attributed to any device is merely by way of example, as the input sources may actually consume more or less power. Further, additional or fewer power-consumption tiers may be present.

Figure 4:
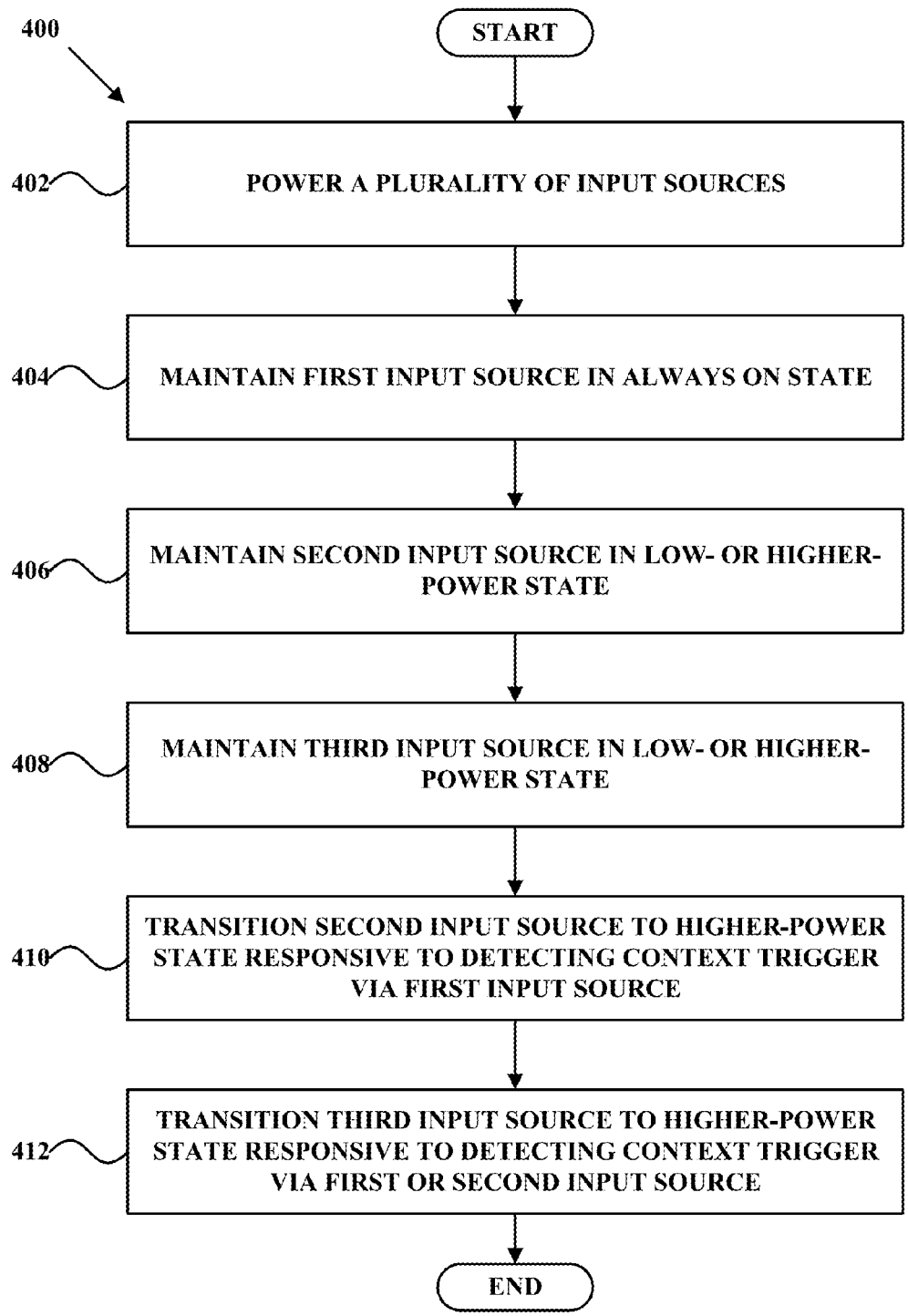
FIG. 4 is a flowchart of a third method, in accordance with exemplary embodiments.

FIG. 4 is a flowchart of a third method, in accordance with exemplary embodiments. As shown in FIG. 4, method 400 begins at step 402 with a computing system powering a processor, a display, and a plurality of input sources via a battery power source.

At step 404, the computing system maintains at least a first input source from among the plurality of input sources in an always-on state. In an embodiment, the always-on state is equivalent to a higher-power state, except that a device in an always-on state cannot be transitioned to a low-power state. An input source in a higher-power or always-on state will likely use more power than if the device were in any other state, but will also likely provide the most functionality.

At step 406, the computing system maintains at least a second input source from among the plurality of input sources in either a low-power state or a higher-power state. Similarly, at step 408, the computing system maintains at least a third input source in either a low-power state or a higher-power state.

In an embodiment, the low-power state is an off state. The input source will likely use less power in this state than in any other state, but will also generally provide the least functionality and may require a relatively considerable amount of time to transition to a different power state.

In another embodiment, the lower power state is a reduced power-consumption state in which the respective device consumes less than one tenth of the power consumption in the higher-power state. While in the reduced power-consumption state, the input source will likely use more power than if it were in the off state, but less power than if it were in the higher-power state. An input source may generally take less time to switch to the on state from the reduced power-consumption state than from the off state, and will generally provide an amount of functionality somewhere between that provided by the input source while in either the off or higher-power state.

Figure 5:
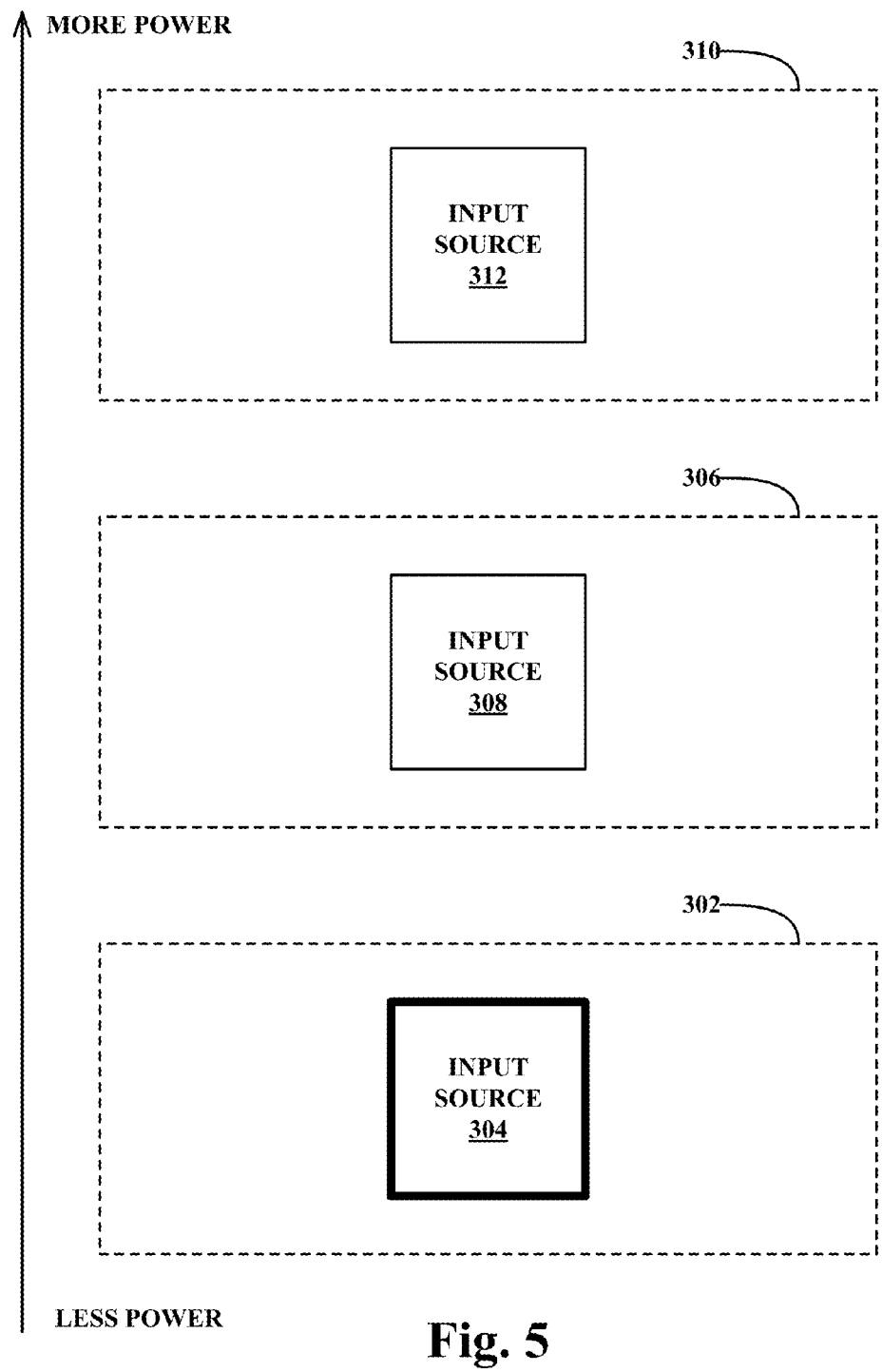

FIG. 5 is a simplified depiction of power-consumption tiers 302, 306, and 310 at steps 404-408, in accordance exemplary embodiments. The thick line surrounding input source 304 signifies that the device is in a higher-power state (in this case, an always-on state), while the thinner lines surrounding input sources 308 and 312 signify that these input sources are in a low-power state.

At step 410, the computing system causes the second input source to transition from a low-power state to a higher-power state in response to detecting a first context trigger via the first input source.

Figure 6:
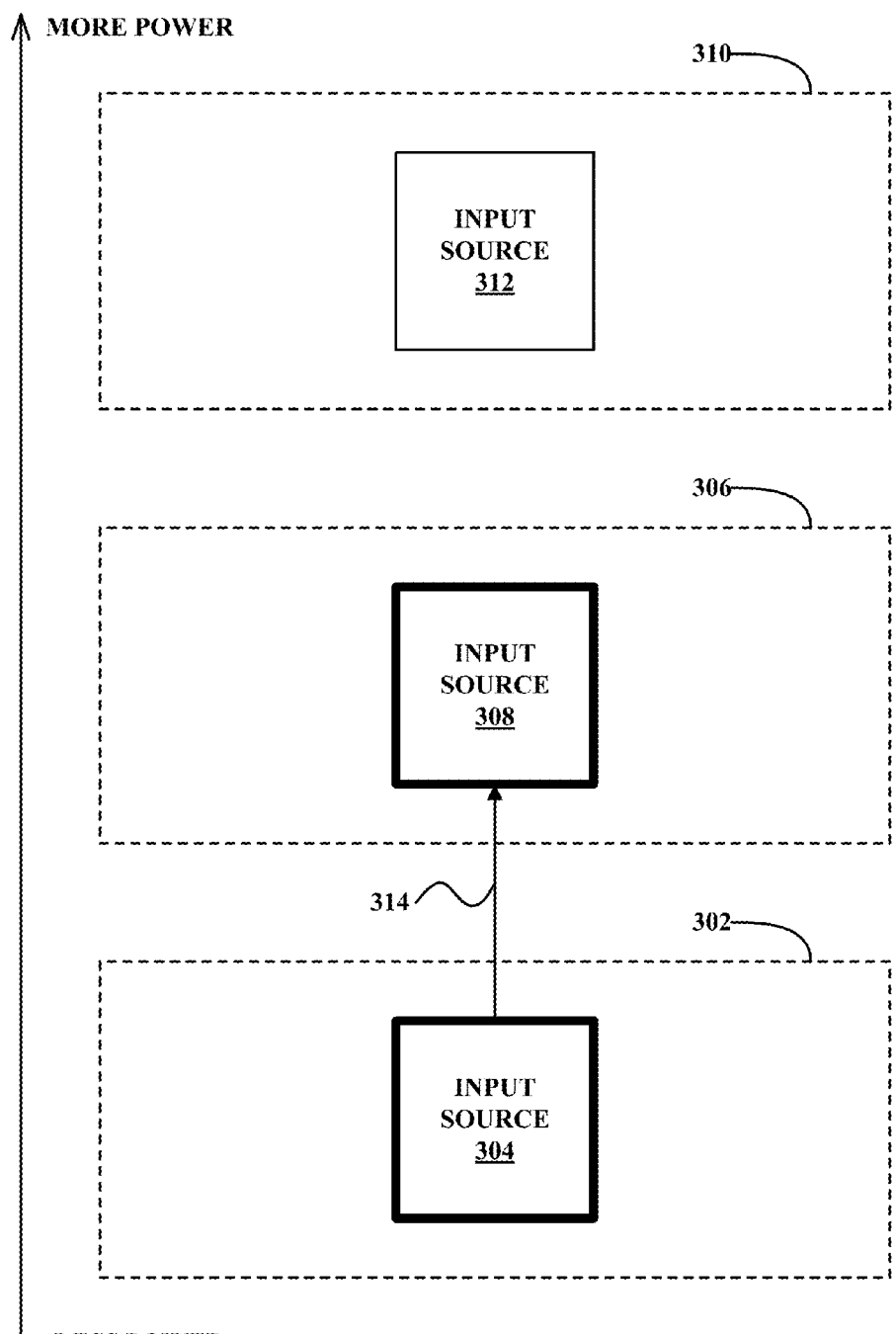

FIG. 6 is a simplified depiction of power-consumption tiers 302, 306, and 310 at step 410, in accordance with exemplary embodiments. As shown, input source 308 is now in a higher-power state (signified by the thick line surrounding the input source) as a result of detecting first context trigger 314 via first input source 308.

At step 412, the computing system causes the third input source to transition from a low-power state to a higher-power state in response to detecting a second context trigger via the first input source and/or the second input source.

Figure 7:
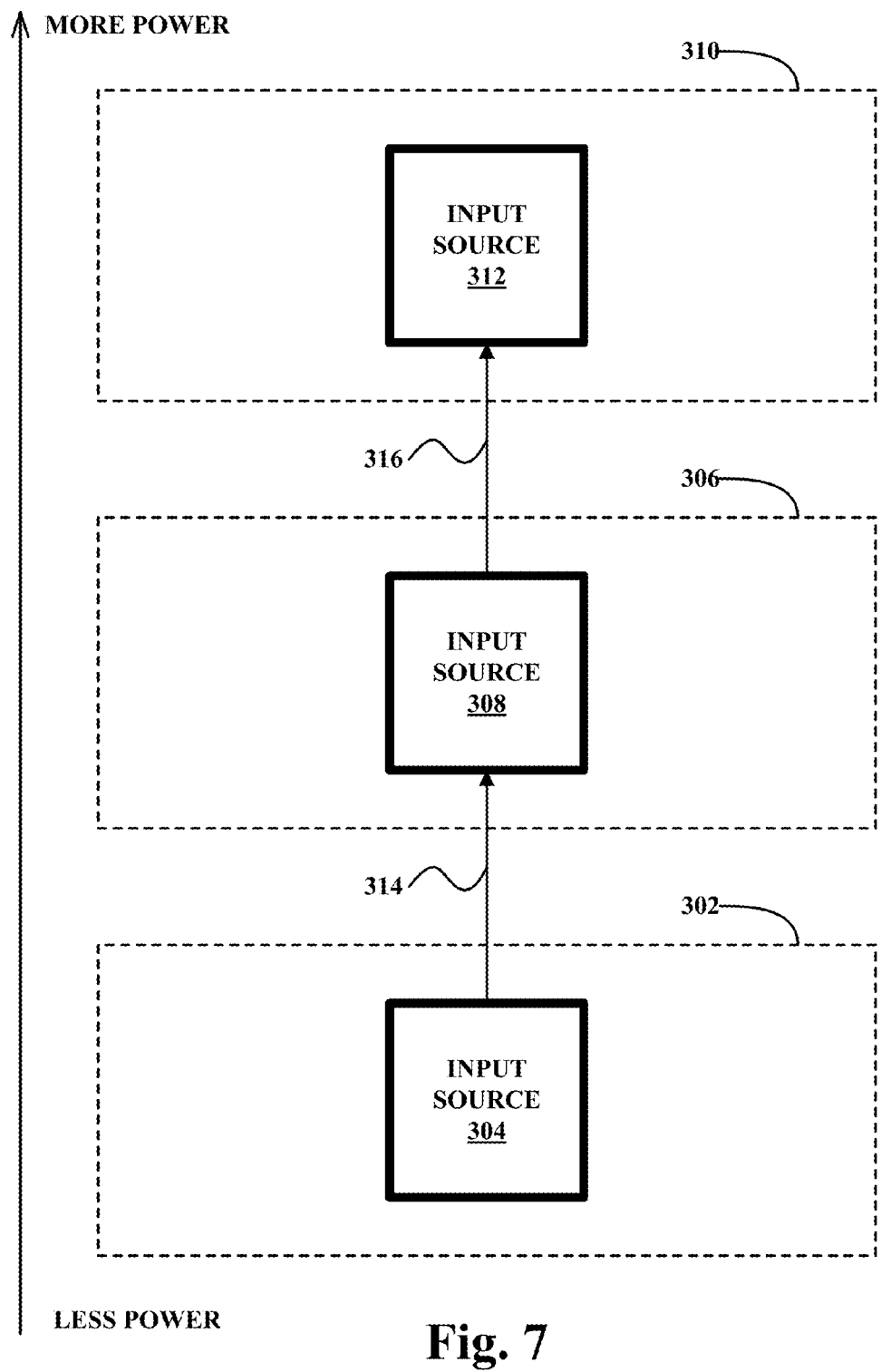

FIG. 7 is a simplified depiction of power-consumption tiers 302, 306, and 310 at step 412, in accordance with one or more embodiments. As shown, third input source 312 is now in a higher-power state (signified by the thick line surrounding the input source) as a result of second context trigger 316 detected via second input source 308.

V. EXAMPLE ARCHITECTURE

Figure 8:
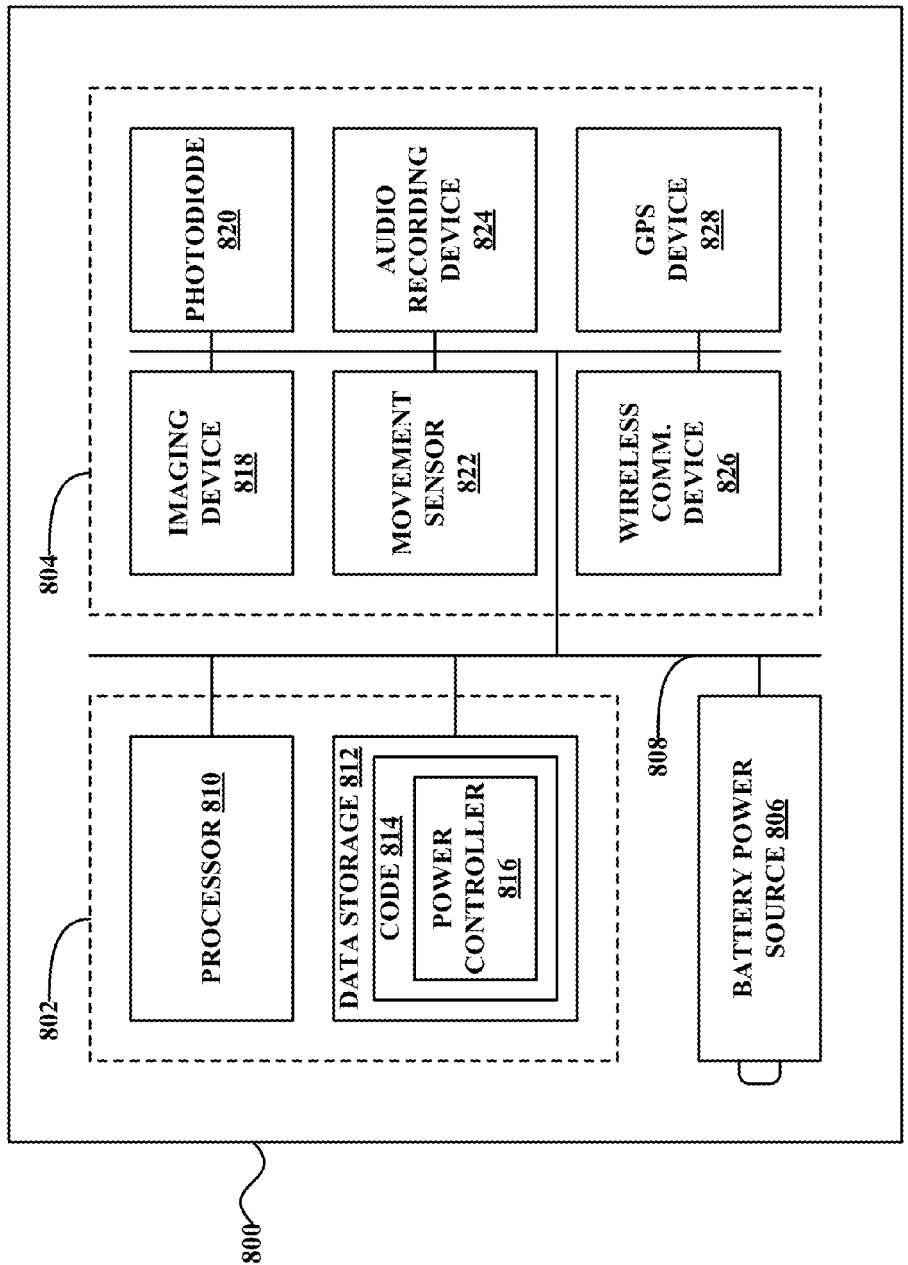
FIG. 8 is a simplified block diagram of a computing system, in accordance with exemplary embodiments.

FIG. 8 is a simplified block diagram of a computing system, in accordance with exemplary embodiments. As shown, computing system 800 may include on-board computing system 802, input sources 804, and battery power source 806, all connected by connection 808.

Battery power source 806 may be configured to provide power to any entity that is part of computing system 800, including (but not limited to) on-board computing system 802 and input sources 804. In an embodiment, the battery power source provides power until the amount of power remaining in the battery power source drops to or below a threshold value. The battery could take the form of a rechargeable battery, among other possibilities. Computing system 800 could include a power input such as a cylindrical direct current (DC) connector or a universal serial bus (USB) input (as examples) that may be used to recharge battery power source 806. As another possibility, battery power source 806 could take the form of a non-rechargeable, user-replaceable battery, such as a AA or AAA battery. Those having skill in the art will recognize that battery power source 806 (and in general a power source for computing system 800) may also or instead take other forms without departing from the scope of the claims.

Connection 808 could take the form of a wired and/or wireless connection. The wired connection could take the form of a serial bus, a parallel bus, a USB connection, and/or an IEEE 1394 connection, as examples. Relatedly, the wireless connection could take the form of a Bluetooth, IEEE 802.15.4 (ZigBee), ANT, Infrared Data Association (IrDA), and/or IEEE 802.11 (Wi-Fi) connection, to name just a few possibilities. Further, connection 808 could actually comprise multiple connections, perhaps with other entities interposed along the multiple connections. Connection 808 may also be able to provide electrical power (perhaps from battery power source 202) to the various components of computing system 800. Connection 808 may take other forms and could provide different and/or additional functionality.

On-board computing system 802 may contain (for example) a processor 810 and data storage 812. Processor 810 may be, for example, a general-purpose microprocessor and/or a discrete signal processor. Though processor 810 is described here as a single processor, those having skill in the art will recognize that on-board computing system 112 may contain multiple (e.g., parallel) processors.

Data storage 812 may store executable software code 814 that is executable by processor 810 to carry out various functions described herein. Alternatively, some or all of the functions could instead be implemented through hardware, firmware, etc.

Power controller 816 may take the form of executable software code (such as code 814). Note that, even though power controller 816 is described as executable software code, the power controller may additionally or alternatively take the form of hardware such as, for example, one or more integrated circuits, and/or firmware, etc. Power controller 816 may take other forms as well. The power controller may be configured to manage power consumption of input sources 804, among other functions.

As shown in FIG. 8, input sources 804 may include an imaging device 818, photodiode 820, movement sensor 822, audio-recording device 824, wireless-communication device 826, and/or global positioning system (GPS) device 828, among other possibilities. Input source 804 may take the form of any type of input source, including input devices (perhaps for allowing a computing-system user to provide input to computing system 800) and/or sensors. Note that additional components may be present as well, and that some components may be omitted.

Imaging device 818 may take the form of a CCD and/or a CMOS imager, among other possibilities. The imaging device may be able to take video and/or still images, as examples. In an embodiment, the imaging device may be configured to track a field of view of computing system 800.

Photodiode 820 may be able to detect changes in lighting conditions surrounding computing system 800, among other functions. Movement sensor 822 may take the form of an accelerometer, a magnetometer, and/or a gyroscope, and or any other device or component capable of detecting movement of computing system 800 (among other possible functions).

Audio-recording device 824 may be any device capable of recording sound, perhaps by converting sound waves to an electrical signal and storing that signal in data storage 812. As such, audio-recording device 824 may comprise one or more components or devices such as a microphone and/or a data storage. In an embodiment, audio-recording device 824 is able to determine when an individual (such as a user of computing system 800) is speaking, perhaps using voice-recognition techniques, sound-recognition techniques, and/or one or more other alternatives.

Wireless-communication device 826 may be any device or component capable of facilitating wireless communication with computing system 800. The wireless communication could involve any of the wireless technologies discussed with reference to connection 808, among other possibilities. In an embodiment, wireless-communication device 826 is able to receive and/or analyze calendar data, appointment data, or location data (or any combination of these).

Global Position System (GPS) device 828 may be a device that is capable of receiving and/or analyzing time or location data (or both). As such, the GPS device could take the form of a GPS receiver, for example. GPS device 828 may communicate with one or more global navigation satellite systems, such as GPS and Galileo (currently being developed by the European Union and the European Space Agency), among others. The GPS device may additionally (or alternatively) communicate with other devices or networks, such as a cellular phone or Wi-Fi network, to receive location data. These other devices/networks may be able to assist wireless-communication device 826 in receiving location data, perhaps by providing "assisted GPS" services.

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 9A:
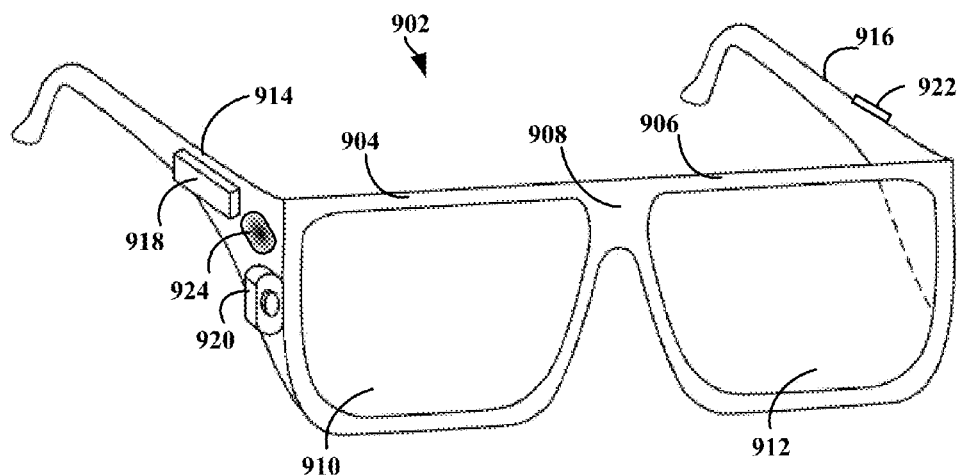
FIGS. 9A and 9B, and 10A and 10B, respectively, depict views of a wearable computing system, in accordance with exemplary embodiments.

FIG. 9A illustrates a wearable computing system according to an exemplary embodiment. In FIG. 9A, the wearable computing system takes the form of a head-mounted device (HMD) 902 (which may also be referred to as a head-mounted display). It should be understood, however, that exemplary systems and devices may take the form of or be implemented within or in association with other types of devices, without departing from the scope of the invention. As illustrated in FIG. 9A, the head-mounted device 902 includes frame elements including lens-frames 904 and 906 and a center frame support 908, lens elements 910 and 910, and extending side-arms 914 and 916. The center frame support 908 and the extending side-arms 914 and 916 are configured to secure the head-mounted device 902 to a user's face via a user's nose and ears, respectively.

Each of the frame elements 904, 906, and 908 and the extending side-arms 914 and 916 may be formed of a solid structure of plastic and/or metal, or may be formed of a hollow structure of similar material so as to allow wiring and component interconnects to be internally routed through the head-mounted device 902. Other materials may be possible as well.

One or more of each of the lens elements 910 and 912 may be formed of any material that can suitably display a projected image or graphic. Each of the lens elements 910 and 912 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 914 and 916 may each be projections that extend away from the lens-frames 904 and 906, respectively, and may be positioned behind a user's ears to secure the head-mounted device 902 to the user. The extending side-arms 914 and 916 may further secure the head-mounted device 902 to the user by extending around a rear portion of the user's head. Additionally or alternatively, for example, the HMD 902 may connect to or be affixed within a head-mounted helmet structure. Other possibilities exist as well.

The HMD 902 may also include an on-board computing system 918, a video camera 920, a sensor 922, and a finger-operable touch pad 924. The on-board computing system 918 is shown to be positioned on the extending side-arm 914 of the head-mounted device 902; however, the on-board computing system 918 may be provided on other parts of the head-mounted device 902 or may be positioned remote from the head-mounted device 902 (e.g., the on-board computing system 918 could be wire- or wirelessly-connected to the head-mounted device 902). The on-board computing system 918 may include a processor and memory, for example. The on-board computing system 918 may be configured to receive and analyze data from the video camera 920 and the finger-operable touch pad 924 (and possibly from other sensory devices, user interfaces, or both) and generate images for output by the lens elements 910 and 912.

The video camera 920 is shown positioned on the extending side-arm 914 of the head-mounted device 902; however, the video camera 920 may be provided on other parts of the head-mounted device 902. The video camera 920 may be configured to capture images at various resolutions or at different frame rates. Many video cameras with a small form-factor, such as those used in cell phones or webcams, for example, may be incorporated into an example of the HMD 902.

Further, although FIG. 9A illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown on the extending side-arm 916 of the head-mounted device 902; however, the sensor 922 may be positioned on other parts of the head-mounted device 902. The sensor 922 may include one or more of a gyroscope or an accelerometer, for example. Other sensing devices may be included within, or in addition to, the sensor 922 or other sensing functions may be performed by the sensor 922. For example, one or more of input source 804 may be positioned on head-mounted device 902.

The finger-operable touch pad 924 is shown on the extending side-arm 914 of the head-mounted device 902. However, the finger-operable touch pad 924 may be positioned on other parts of the head-mounted device 902. Also, more than one finger-operable touch pad may be present on the head-mounted device 902. The finger-operable touch pad 924 may be used by a user to input commands. The finger-operable touch pad 924 may sense at least one of a position and a movement of a finger via capacitive sensing, resistance sensing, or a surface acoustic wave process, among other possibilities. The finger-operable touch pad 924 may be capable of sensing finger movement in a direction parallel or planar to the pad surface, in a direction normal to the pad surface, or both, and may also be capable of sensing a level of pressure applied to the pad surface. The finger-operable touch pad 924 may be formed of one or more translucent or transparent insulating layers and one or more translucent or transparent conducting layers. Edges of the finger-operable touch pad 924 may be formed to have a raised, indented, or roughened surface, so as to provide tactile feedback to a user when the user's finger reaches the edge, or other area, of the finger-operable touch pad 924. If more than one finger-operable touch pad is present, each finger-operable touch pad may be operated independently, and may provide a different function.

Figure 9B:
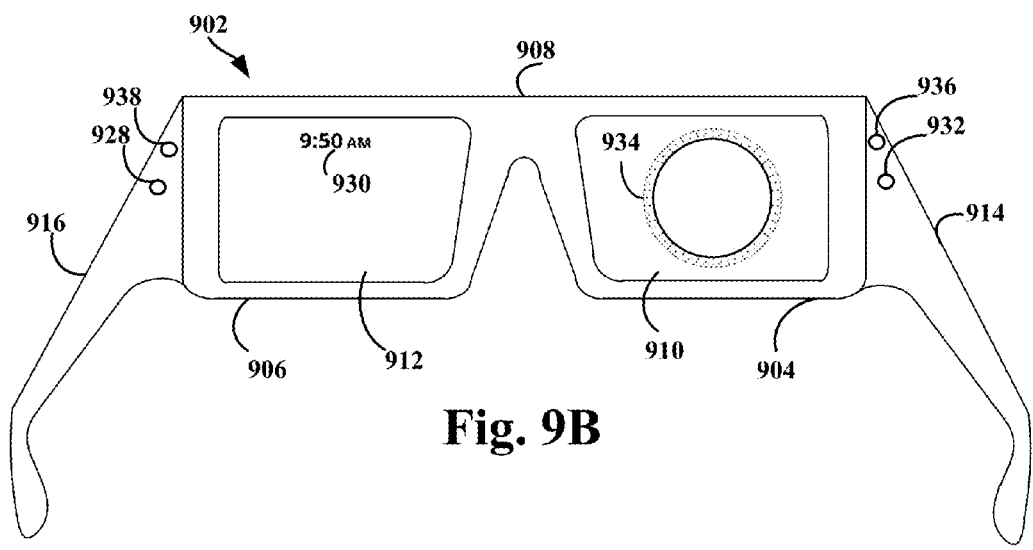

FIG. 9B illustrates an alternate view of the wearable computing device illustrated in FIG. 9A. As shown in FIG. 9B, the lens elements 910 and 912 may act as display elements. The head-mounted device 902 may include a first projector 928 coupled to an inside surface of the extending side-arm 916 and configured to project a display 930 onto an inside surface of the lens element 912. Additionally or alternatively, a second projector 932 may be coupled to an inside surface of the extending side-arm 914 and configured to project a display 934 onto an inside surface of the lens element 910.

The head-mounted device 902 may also include one or more sensors coupled to an inside surface of head-mounted device 902. For example, as shown in FIG. 9B, sensor 936 coupled to an inside surface of the extending side-arm 914, and/or sensor 938 coupled to an inside surface of the extending side-arm 916. The one or more sensors could take the form of a still or video camera (such as a charge-coupled device or CCD), any of the forms discussed with reference to sensor 922, and/or numerous other forms, without departing from the scope of the claims. The one or more sensors (perhaps in coordination with one or more other entities) may be configured to perform eye tracking, such as gaze-target tracking, etc.

The lens elements 910, 912 may act as a combiner in a light projection system and may include a coating that reflects the light projected onto them from the projectors 928 and 932. In some embodiments, a reflective coating may not be used (e.g., when the projectors 928 and 932 are scanning laser devices).

In alternative embodiments, other types of display elements may also be used. For example, the lens elements 910 and 912 themselves may include a transparent or semi-transparent matrix display such as an electroluminescent display or a liquid crystal display, one or more waveguides for delivering an image to the user's eyes, and/or or other optical elements capable of delivering an in focus near-to-eye image to the user, among other possibilities. A corresponding display driver may be disposed within the frame elements 904, 906 for driving such a matrix display. Alternatively or additionally, a laser or LED source and scanning system could be used to draw a raster display directly onto the retina of one or more of the user's eyes. Other possibilities exist as well.

Figure 10A:
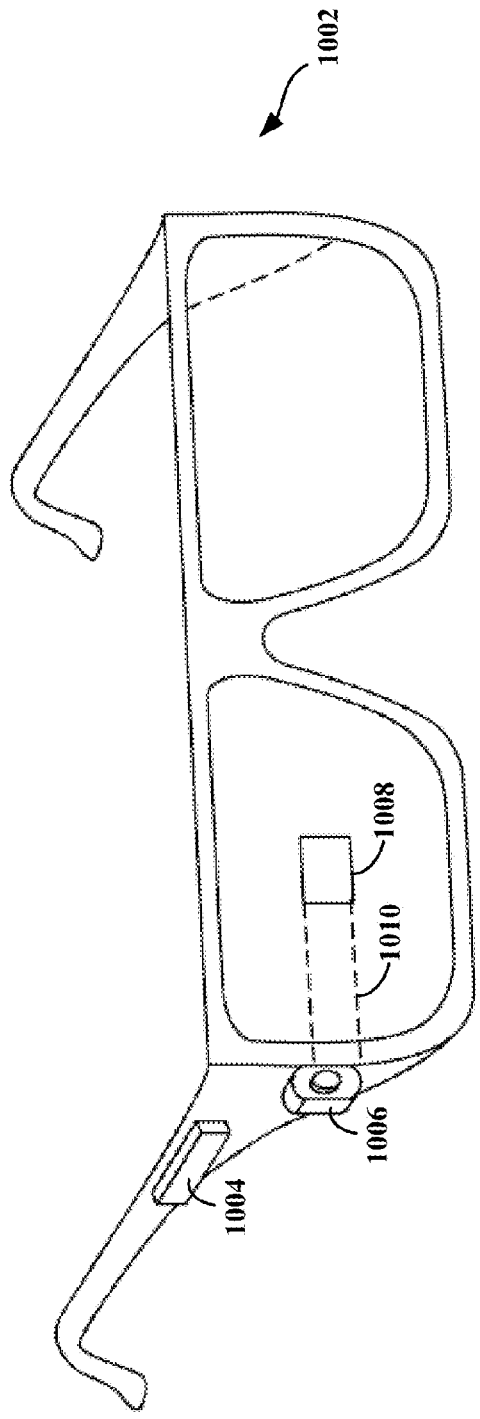

FIG. 10A illustrates another wearable computing system according to an exemplary embodiment, which takes the form of an HMD 1002. The HMD 1002 may include frame elements and side-arms such as those described with respect to FIGS. 9A and 9B. The HMD 1002 may additionally include an on-board computing system 1004 and a video camera 1006, such as those described with respect to FIGS. 9A and 9B. The video camera 1006 is shown mounted on a frame of the HMD 1002. However, the video camera 1006 may be mounted at other positions as well.

As shown in FIG. 10A, the HMD 1002 may include a single display 1008 which may be coupled to the device. The display 1008 may be formed on one of the lens elements of the HMD 1002, such as a lens element described with respect to FIGS. 9A and 9B, and may be configured to overlay computer-generated graphics in the user's view of the physical world. The display 1008 is shown to be provided in a center of a lens of the HMD 1002, however, the display 1008 may be provided in other positions. The display 1008 is controllable via the computing system 1004 that is coupled to the display 1008 via an optical waveguide 1010.

Figure 10B:
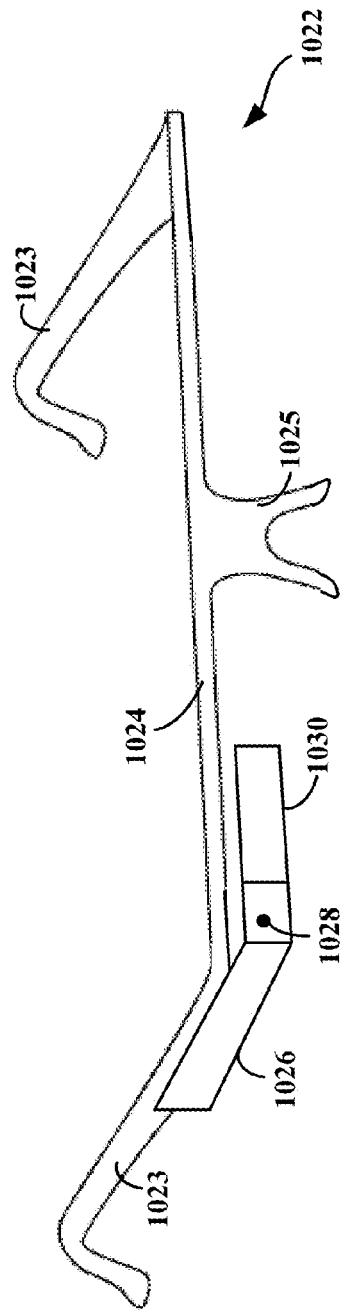

FIG. 10B illustrates another wearable computing system according to an exemplary embodiment, which takes the form of an HMD 1022. The HMD 1022 may include side-arms 1023, a center frame support 1024, and a bridge portion with nosepiece 1025. In the example shown in FIG. 10B, the center frame support 1024 connects the side-arms 1023. The HMD 1022 does not include lens-frames containing lens elements. The HMD 1022 may additionally include an on.board computing system 1026 and a video camera 1028, such as those described with respect to FIGS. 9A and 9B.

The HMD 1022 may include a single lens element 1030 that may be coupled to one of the side-arms 1023 or the center frame support 1024. The lens element 1030 may include a display such as the display described with reference to FIGS. 9A and 9B, and may be configured to overlay computer-generated graphics upon the user's view of the physical world. In one example, the single lens element 1030 may be coupled to the inner side (i.e., the side exposed to a portion of a user's head when worn by the user) of the extending side-arm 1023. The single lens element 1030 may be positioned in front of or proximate to a user's eye when the HMD 1022 is worn by a user. For example, the single lens element 1030 may be positioned below the center frame support 1024, as shown in FIG. 10B.

VI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computing system comprising:
a non-transitory computer-readable medium; and
program instructions stored on the non-transitory computer-readable medium and executable by at least one processor to:
cause a computing device to operate in a lower-power state, wherein data is received from a first input source while in the lower-power state;
while the computing device is in the lower-power state, determine, based on data received from the first input source, that at least a threshold probability exists that detection of a context of the computing device will improve by causing the computing device to operate in a medium-power state, wherein data is received from a second input source while in the medium-power state, and wherein power consumption of the second input source in the medium-power state is greater than power consumption of the first input source in the lower-power state;
responsively cause the computing device to operate in the medium-power state;
while the computing device is in the medium-power state, determine, based on data received from one or both of the first input source and the second input source, that at least an additional threshold probability exists that detection of the context of the computing device will improve by causing the computing device to operate in a higher-power state, wherein data is received from a third input source while in the higher-power state, and wherein power consumption of the third input source in the higher-power state is greater than power consumption of the second input source in the medium-power state; and
responsively cause the computing device to operate in the higher-power state.

2. The computing system of claim 1, wherein the first input source comprises a photodiode, and wherein the program instructions executable to determine that at least the threshold probability exists that detection of the context of the computing device will improve by causing the computing device to operate in the medium-power state comprise program instructions executable to detect a change in lighting conditions surrounding the computing device.

3. The computing system of claim 1, wherein the first input source comprises a movement sensor, and wherein the program instructions executable to determine that at least the threshold probability exists that detection of the context of the computing device will improve by causing the computing device to operate in the medium-power state comprise program instructions executable to detect a movement of the computing device.

4. The computing system of claim 3, wherein the movement sensor comprises one or more of an accelerometer, a magnetometer, and a gyroscope.

5. The computing system claim 1, wherein the second input source comprises an audio-recording device, and wherein the program instructions executable to determine that at least the additional threshold probability exists that detection of the context of the computing device will improve by causing the computing device to operate in the higher-power state comprise program instructions executable to detect that a user of the computing device is speaking.

6. The computing system of claim 1, wherein the second input source comprises a wireless-communication device, and wherein the program instructions executable to determine that at least the additional threshold probability exists that detection of the context of the computing device will improve by causing the computing device to operate in the higher-power state comprise program instructions executable to detect reception via the wireless-communication device of one or more of calendar data, appointment data, and location data.

7. The computing system of claim 1, wherein the second input source comprises a global positioning system (GPS) device, and wherein the program instructions executable to determine that at least the additional threshold probability exists that detection of the context of the computing device will improve by causing the computing device to operate in the higher-power state comprise program instructions executable to detect reception via the GPS device of location data.

8. The computing system of claim 1, wherein the second input source comprises an imaging device operable to track a field of view of a user of the computing system.

9. The computing system of claim 8, wherein the imaging device comprises at least one of a charge-coupled device (CCD) and a complementary metal-oxide-semiconductor (CMOS) imager capable of capturing at least one of video and still images.

10. An apparatus comprising:
a processor;
a display element configured to receive information from the processor and to display the information;
a wearable frame structure supporting the display element;
a plurality of input sources, comprising:
a first input source, wherein an average power consumption of the first input source places the first input source in a first power-consumption tier; and
a second input source, wherein an average power consumption of the second input source places the second input source in a second power-consumption tier, wherein the second power-consumption tier is associated with greater power consumption than is the first power-consumption tier;

a third input source, wherein an average power consumption of the third input source places the third input source in a third power-consumption tier, wherein the third power-consumption tier is associated with greater power consumption than is the second power-consumption tier;

a power source configured to provide power to at least the processor, the display element, and the plurality of input sources, the power source comprising a battery power source; and a power controller configured to manage a power consumption of the plurality of input sources at least in part by (i) causing the first input source to remain in an always-on state, (ii) causing the second input source to transition from a second-input-source low-power state up to a second-input-source higher-power state responsive to detecting a first context trigger via the first input source, and (iii) causing the third input source to transition from a third-input-source low-power state up to a third-input-source higher-power state responsive to detecting a second context trigger via one or both of the first input source and the second input source.

11. The apparatus of claim 10, wherein the third power-consumption tier comprises input sources having an average power consumption within a third range that is an order of magnitude greater than the second range.

12. The apparatus of claim 10, wherein the third power-consumption tier comprises input sources having an average power consumption of more than 200 mW.

13. The apparatus of claim 10, wherein the second input source comprises an audio-recording device, and wherein the second context trigger comprises the condition that a wearer of the wearable frame structure is speaking.

14. The apparatus of claim 10, wherein the second input source comprises a wireless-communication device, and wherein the second context trigger comprises reception via the wireless-communication device of one or more of calendar data, appointment data, and location data.

15. The apparatus of claim 10, wherein the second input source comprises a global positioning system (GPS) device, and wherein the second context trigger comprises reception via the GPS device of location data.

16. The apparatus of claim 10, wherein the third input source comprises an imaging device disposed on the wearable frame structure and operable to track a field of view of a wearer of the wearable frame structure.

17. The apparatus of claim 16, wherein the imaging device comprises at least one of a charge-coupled device (CCD) and a complementary metal-oxide-semiconductor (CMOS) imager capable of capturing at least one of video and still images.

18. The apparatus of claim 10, wherein the first input source comprises at least one of a photodiode and a movement sensor, wherein the second input source comprises at least one of a an audio-recording device, a wireless-communication device, and a global positioning system (GPS) device, and wherein the third input source comprises an imaging device.

19. The apparatus of claim 18, wherein the first context trigger comprises one or more of (i) a change in lighting conditions surrounding the wearable display and (ii) a movement of the wearable display, and wherein the second context trigger comprises one or more of (i) the condition that a wearer of the wearable frame structure is speaking and (ii) reception via the wireless-communication device of one or more of calendar data, appointment data, and location data.

20. The apparatus of claim 10, wherein the first power-consumption tier comprises input sources having an average power consumption within a first range, and wherein the second power-consumption tier comprises input sources having an average power consumption within a second range that is an order of magnitude greater than the first range.

21. The apparatus of claim 10, wherein the first input source comprises a photodiode, and wherein the first context trigger comprises a change in lighting conditions surrounding the wearable frame structure.

22. The apparatus of claim 10, wherein the first input source comprises a movement sensor, and wherein the first context trigger comprises a movement of the wearable frame structure.

23. The apparatus of claim 22, wherein the movement sensor comprises one or more of an accelerometer, a magnetometer, and a gyroscope.

24. An apparatus comprising:
a processor;
a display element configured to receive information from the processor and to display the information;
a wearable frame structure supporting the display element;
a plurality of input sources, comprising:
 a first input source, wherein an average power consumption of the first input source places the first input source in a first power-consumption tier, wherein the first power-consumption tier comprises input sources that each have an average power consumption of less than 10 milliwatts (mW); and
 a second input source, wherein an average power consumption of the second input source places the second input source in a second power-consumption tier, wherein the second power-consumption tier comprises input sources that each have an average power consumption of more than 10 mW but less than 200 mW;
a power source configured to provide power to at least the processor, the display element, and the plurality of input sources, the power source comprising a battery power source; and
a power controller configured to manage a power consumption of the plurality of input sources at least in part by (i) causing the first input source to remain in an always-on state, and (ii) causing the second input source to transition from a second-input-source low-power state up to a second-input-source higher-power state responsive to detecting a first context trigger via the first input source.

* * * * *